3,470,238
Patented Sept. 30, 1969

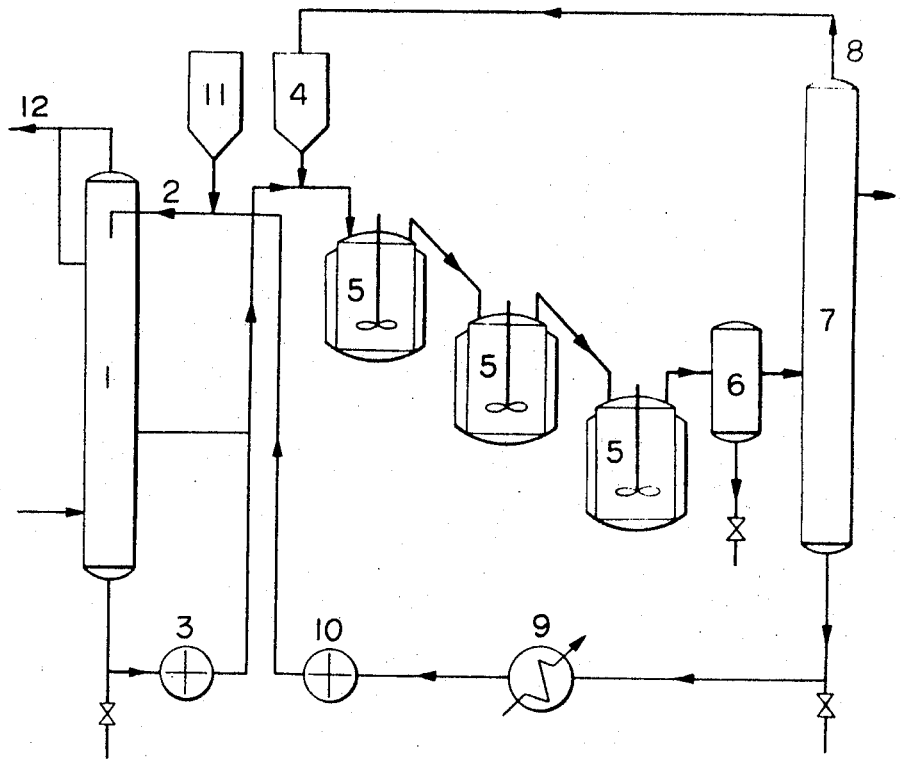

3,470,238
PROCESS FOR RECOVERING ACRYLIC AND METHACRYLIC ESTER
Taisuke Asano and Mamoru Nakano, Tokyo, Yasuhiro Sato, Yokkaichi-shi, and Takashi Shimodaira and Keiko Kamata, Tokyo, Japan, assignors to Mitsubishi Petrochemical Co., Ltd., Tokyo, Japan, a corporation of Japan
Filed Nov. 3, 1965, Ser. No. 506,214
Claims priority, application Japan, Nov. 6, 1964, 39/62,479
Int. Cl. C07c 69/54, 67/06, 51/42
U.S. Cl. 260—486        6 Claims

ABSTRACT OF THE DISCLOSURE

A process for recovering acrylic and/or methacrylic acid from a dilute aqueous solution thereof in the form of esters thereof. The acids in said aqueous solution are extracted with tri-n-butyl phosphate or acetophenone and the extract is directly esterified with an alcohol in the presence of a cation exchange resin as a catalyst. The thusly formed esters are thereafter recovered from the esterified extract.

---

The present invention relates to a process for recovering acrylic and/or methacrylic ester in pure form from a dilute aqueous solution containing acrylic and/or methacrylic acid.

The description "acrylic and/or methacrylic" may be hereinafter referred to simply as "acrylic and methacrylic."

It is well known that acrylic or methacrylic acid is, like any other organic acid, esterified with alcohols, thereby forming esters thereof. Namely, in the conventional processes, acrylic or methacrylic acid is liquid phase esterified in the presence of sulfuric acid, sulfonic acid or salts thereof, or ion exchange resin, etc., as a catalyst, or gas phase esterified in the presence of acid in the form of a solid as a catalyst to form esters thereof.

In these liquid phase processes of the prior art, esterification is carried out under such conditions that the concentration of acrylic or methacrylic acid in an aqueous solution thereof is extremely high which condition ensures more advantageous proceeding of the esterification in view of the equilibrium between acrylic or methacrylic acid and alcohols, and which further provide advantages in that the esterification may be carried out while preventing polymerization of the acrylic or methacrylic acid and the resultant ester.

However, it is impossible to apply these processes of the prior art for recovering acrylic and methacrylic ester commercially from a dilute aqueous solution containing acrylic and methacrylic acid, because these conventional processes enable recovery of acrylic or methacrylic ester from said dilute aqueous solution only in an extremely low yield, and furthermore, there is a tendency of polymerization of acrylic or methacrylic acid and the ester produced thereby.

As an alternative method, a process for esterifying acrylic or methacrylic acid, which is obtained from a dilute aqueous solution thereof by extracting same using an extracting agent such as various ketones or aromatic hydrocarbons, in an aqueous medium having suitably high concentration of acrylic or methacrylic acid according to the above-mentioned conventional method has been proposed. However, the process has a disadvantage in that it requires two stages of distillation, i.e., one to obtain free acrylic or methacrylic acid from the extract mixture and another to recover the esters thereof from the aqueous medium. Particularly, in the case where the concentration of acrylic or methacrylic acid in the raw aqueous solution is extremely low, the process not only requires a greater amount of heat in obtaining the intermediate free acids and the product esters thereof, but also the yield of acrylic or methacrylic esters to be recovered is unsatisfactorily low, based on the weight of acrylic or methacrylic acid contained in the raw aqueous solution. Accordingly, the process is undesirable from a commercial point of view.

An object of the present invention, therefore, is to provide a process for recovering acrylic and methacrylic ester from a dilute aqueous solution containing acrylic and methacrylic acid effectively free from the disadvantages appertaining to the processes of the prior art as described above.

The novel process of the present invention for recovering acrylic and methacrylic ester from a dilute aqueous solution containing a low concentration of acrylic and methacrylic acid comprises extracting the acid from the dilute aqueous solution with a suitable extracting solvent, reacting the resultant extract mixture comprising acrylic and methacrylic acid, a small amount of water and the solvent with an alcohol in the presence of a cation exchange resin and recovering the desired ester.

The term "ion exchange resin" when used hereinafter will be understood to mean a cation exchange resin.

Although the first stage of the process of the present invention, i.e., the extraction of acrylic and methacrylic acid from the aqueous solution using an extracting agent is known, one of the features of the process of the present invention resides in the esterification of the extract mixture comprising essentially acrylic and methacrylic acid and solvent with alcohol in the presence of the ion exchange resin thereby producing the ester thereof in the solvent medium without first isolating acrylic and methacrylic acid from the extract mixture.

In other words, unlike the processes of prior art which require isolation of free acrylic and methacrylic acid from the extract mixture by means of distillation and preparation of an aqueous solution of free acrylic and methacrylic acid thus obtained before esterification, one of the most outstanding and novel features of the present invention resides in the direct, in situ esterification of acrylic and methacrylic acid in a substantially anhydrous organic solvent which is the extracting agent in the process of the present invention, without requiring said isolation and preparation of aqueous solution, in the presence of an ion exchange resin to obtain esters thereof.

According to the process of the present invention, acrylic and methacrylic ester may be recovered quite efficiently from a dilute solution containing less than 10% of said acid. Needless to say, the higher the concentration of said acid in the solution, the better the result obtained. For instance, the process of the present invention may be successfully employed for recovering acrylic and methacrylic ester from a dilute aqueous solution of low concentration of acrylic and methacrylic acid obtained by direct oxidation of hydrocarbons by air.

As extracting agents which may be used in the process of the present invention, various esters and ketones are given, and particularly, tri-n-butyl phosphate, acetophenone, etc., are preferable. Extracting agents which may adversely affect the activity or mechanical strength of the ion exchange resin are unsuitable.

Any ion exchange resin may be used in the process of the present invention so long as it is insoluble in the extracting agent, and particularly, a cation exchange resin is most preferable due to the high efficiency of esterification. Also, among these ion exchange resins, better results may be obtained with the use of a resin having great exchange capacity, high water absorption capacity and, further, a low degree of cross-linking.

In accordance with the process of the present invention, esterification of acrylic and methacrylic acid is carried out in the organic solvent in the presence of the ion exchange resin as a catalyst at a temperature in the vicinity of the boiling point of the alcohol with which acrylic and methacrylic acid is to be esterified.

Two to three mols of alcohol are preferably used per mol of acrylic and methacrylic acid. The amount of ion exchange resin used in the process of the present invention may be from 5 to 10% by weight based on the total weight of the reacting solution. Esterification according to the process of the present invention may be carried out either in a batch process or a continuous process. The reaction period may considerably vary depending upon the amount of catalyst used, however, in general, from half an hour to five hours, preferably from one to two hours, may be required.

One of the features of the process of the present invention is that inasmuch as the amount of water carried along with the organic extracting agents in the extraction stage is rather small, and as a result, the esterification is carried out under substantially anhydrous conditions, therefore, the esterification efficiency is greatly enhanced from the viewpoint of chemical equilibrium.

Further, another outstanding feature is that the esterification according to the process of the present invention does not use any acid catalyst, for instance, inorganic acids such as sulfuric acid, or organic acid such as p-toluenesulfonic acid, which are usually used in the conventional processes, but makes use of an ion exchange resin instead, therefore, separation of the resultant ester from the reaction mixture after completion of the esterification is made much easier.

The process of the present invention will be explained in conjunction with the accompanying drawing.

The accompanying drawing illustrates the process of the present invention in a simplified flow diagram.

Firstly, a dilute aqueous solution containing acrylic and methacrylic acid obtained for example by oxidation of hydrocarbon is supplied to extracting tower 1 at the bottom thereof as a side stream. Extraction is carried out in extracting tower 1 by contacting the dilute aqueous solution in countercurrent with an extracting agent which is supplied to extracting tower 1 at the top 2 as another side stream. Extract mixture containing acrylic and methacrylic acid, water and a small amount of impurities is then led to esterification tank 5 by a pump 3. On the other hand, the required amount of alcohol is introduced to esterification tank 5 from alcohol tank 4. Said esterification tank 5 is provided with a steam heater and a stirrer and is controlled at the desired reaction temperature and catalyst concentration. Said esterification tank 5 consists of the batch reactors connected in series and which are positioned stepwise in a number adequate to give the reactants an optimum residence period. The resultant extract mixture thus obtained is introduced into separator 6 wherein a small amount of solid precipitates are separated. After the separation of solid precipitates, the solution is then led to distillation tower 7 wherein the resultant ester is separated. Alcohol which is separated at the top 8 of said distillation tower 7 is recirculated to alcohol tank 4 for recycling. In the meantime, the extracting agent which is separated at the bottom of distillation tower 7 is again supplied to extracting tower 1 by a circulating pump 10 through a cooling unit 9. Since the extracting agent which is separated at the bottom of distillation tower 7 contains a small amount of polymeric material therein, said extracting agent is treated with alkali and washed with water before it is reused. Alcohol and the extracting agent consumed in the process described above are replenished from alcohol tank 4 and extracting agent tank 11.

On the other hand, the aqueous solution containing the small amount of acrylic and methacrylic acid which is not extracted and the extracting agent which is discharged at the top 12 of extracting tower 1 is recirculated to the oxidation stage.

Inhibitors are adequately supplied from alcohol tank 4 in the form of alcohol solution to the esterification stage for preventing polymerization in the esterification and distillation stages.

The process of the present invention may be better understood in the following examples, however, it should not be construed that these examples restrict the present invention in any event, since they are given merely by way of illustration.

Example 1

An aqueous solution containing 3.7% by weight of acrylic acid was supplied to the extracting tower 1 to which acetophenone was also supplied as an extracting agent at the top of said extracting tower 1 as a side stream 2. The proportion of said acetophenone was 1 part by weight to 4 parts by weight of said aqueous solution. The number of the extracting plates was about two and 66.7% by weight of acrylic acid was extracted from said aqueous solution. 3.77 gram-moles of methanol were supplied to said extract solution per gram-mole of acrylic acid contained therein. The resultant mixture was then fed to the esterification tank 5 and the acrylic acid contained therein was esterified in the presence of 13.7 parts by weight of ion exchange resin per 100 parts by weight of the total reactant solution at 60° C. for a total residence period of 5 hours. Methyl acrylate was obtained in a yield of 84.8% based on the weight of acrylic acid in the extract solution. The yield of methyl acrylate was 56.6% based on the weight of acrylic acid contained in said raw aqueous solution. The ion exchange resin used in the process described above was Amberlite IR–120.

Example 2

3.4 gram-moles of methanol were supplied to the extract mixture obtained according to the procedure as described in Example 1 per gram-mole of acrylic acid contained therein. Said extract mixture was then fed into the esterification tank 5 and esterified in the presence of 14.0 parts by weight of ion exchange resin per 100 parts by weight of the total reactant solution at 60° C. for a total residence period of 5 hours.

Methyl acrylate thus obtained in a yield of 85.5% based on the weight of acrylic acid in said extract solution. The yield of methyl acrylate was 57.0% based on the weight of acrylic acid contained in the raw aqueous solution. The ion exchange resin used in the process described above was Diaion SK–102.

Example 3

3.50 gram-moles of methanol were supplied to the extract mixture obtained according to the procedure described in Example 1 per mole of acrylic acid contained therein.

The resultant mixture was then fed to the esterification tank 5 and esterified in the presence of 14.1 parts by weight of ion exchange resin per 100 parts by weight of the total reactant solution at 60° C. for a residence period of 5 hours.

Methyl acrylate was obtained in a yield of 103.6% on the basis of the weight of acrylic acid in the extract solution. The yield of methyl acrylate based on the weight of acrylic acid contained in the raw aqueous solution was 69.2%.

The ion exchange resin used in the process described above was Diaion SK–102.

Example 4

An aqueous solution containing 3.48% by weight of acrylic acid was fed to extracting tower 1 to which tri-n-butyl phosphate was supplied as the extracting agent at the top of said extracting tower 1 as a side stream 2. The proportion of tri-n-butyl phosphate was 1 part by weight to 5 parts by weight of said aqueous solution.

The number of the extracting plates was about two and 89.9% by weight of acrylic acid was extracted from the aqueous solution thereof. 3.45 gram-moles of methanol were then supplied to said extract mixture per mole of acrylic acid contained therein. The resultant mixture was fed to esterification tank 5 and esterified in the presence of 14.3 parts by weight of ion exchange resin per 100 parts by weight of the total reactant solution at 60° C. for a total residence period of 5 hours, thereby obtaining methyl acrylate in a yield of 62.7% based on the weight of acrylic acid in said extract solution. The yield of methyl acrylate based on the weight of acrylic acid contained in the raw aqueous solution was 56.5%. The ion exchange resin used in the process described in the above was Amberlite IR-120.

Example 5

3.21 gram-moles of methanol were supplied to the extract mixture obtained according to the procedures described in Example 4 per mole of acrylic acid contained therein. The resultant mixture was then fed to esterification tank 5 and esterified in the presence of 14.0 parts by weight of ion exchange resin per 100 parts by weight of the total reactant solution at 60° C. for a total residence period of 5 hours. Methyl acrylate was obtained in a yield of 83.2% based on the weight of acrylic acid in said extract solution. The yield of methyl acrylate based on the weight of acrylic acid contained in said raw aqueous solution was 74.9%. The ion exchange resin used in the process described above was Diaion SK-102.

Example 6

Extraction was carried out according to the procedure described in Example 4 except that a three-plate extraction tower was used. 96.4% by weight of acrylic acid contained in the aqueous solution thereof was thus extracted therefrom. 2.00 gram-moles of methanol were then supplied to said extract mixture per mole of acrylic acid contained therein. The resultant mixture was fed to esterification tank 5 and esterified in the presence of 25.6 parts by weight of ion exchange resin per 100 parts by weight of the total reactant solution at 64° C. for a total residence period of one hour.

Methyl acrylate was thus obtained in a yield of 76.8% based on the weight of acrylic acid in said extract solution. The yield of methyl acrylate based on the weight of acrylic acid contained in the raw aqueous solution was 74.0%. The ion exchange resin used in the process described above was Diaion SK-102.

Example 7

Extraction was carried out according to the same procedure is described in Example 4 except that a four-plate extracting tower was used. 99.0% by weight of acrylic acid contained in the aqueous solution thereof was thus extracted therefrom. 1.50 gram-moles of methanol were then supplied to the extract mixture of acrylic acid contained therein. The resultant mixture was then fed to esterification tank 5 and esterified in the presence of 20 parts by weight of ion exchange resin per 100 parts by weight of the total reactant solution at 64° C. for a total residence period of one and a half hours.

Methyl acrylate was obtained in a yield of 79.6% based on the weight of acrylic acid in said extract solution. The yield of methyl acrylate based on the weight of acrylic acid contained in the raw aqueous solution was 78.8%. The ion exchange resin used in the process described above was Diaion SK-102.

What we claim is:

1. A process for recovering at least one member selected from the group consisting of acrylic and methacrylic acid from a dilute aqueous solution thereof which comprises extracting said at least one member from a dilute aqueous solution thereof with an extracting agent selected from the group consisting of tri-n-butyl phosphate and acetophenone, esterifying said at least one member contained in the resulting extract mixture with an alcohol in the presence of a cation exchange resin as a catalyst and recovering the ester of said at least one member from the reaction mixture.

2. A process as claimed in claim 1 wherein the amount of cation exchange resin used corresponds to 5–10% by weight based on the weight of the reacting solution.

3. A process as claimed in claim 1 wherein esterifying is effected at a temperature near the boiling point of the alcohol.

4. A process as claimed in claim 1 wherein the alcohol is methanol.

5. A process as claimed in claim 1 wherein the alcohol is present in an amount corresponding to 2–3 moles per mole of said at least one member.

6. A process as claimed in claim 1 wherein esterification is effected for 0.5–5 hours.

References Cited

UNITED STATES PATENTS 2,922,815   1/1960   Faerber _____ 260—526
3,278,585  10/1966   Baker et al. _____ 260—488 XR

FOREIGN PATENTS 159,832   1964   U.S.S.R.

OTHER REFERENCES

Tsuda et al.: Chemical Abstracts, vol. 48, 3896–3897 (1954).

Andrianova: Chemical Abstracts, vol. 60, 13,108 (May 1964).

Andrianova: Chemical Abstracts, vol. 61, 13,152 (November 1964).

LORRAINE A. WEINBERGER, Primary Examiner

ALBERT P. HALLUIN, Assistant Examiner

U.S. Cl. X.R.

260—526